United States Patent [19]

Kiser, Jr.

[11] 4,256,197
[45] Mar. 17, 1981

[54] CRUISE CONTROL

[75] Inventor: Cecil M. Kiser, Jr., Newkirk, Okla.

[73] Assignee: NEP Sales, Inc., Glendale, Calif.

[21] Appl. No.: 8,858

[22] Filed: Feb. 2, 1979

[51] Int. Cl.³ .................. B60K 26/02; G05G 1/08
[52] U.S. Cl. ................................. 180/335; 24/270; 74/488; 74/531
[58] Field of Search ............ 180/77 R, 335; 74/488, 74/489, 531; 24/270, 271, 273

[56] References Cited

U.S. PATENT DOCUMENTS

| 2,066,148 | 12/1936 | Heiber et al. | 24/271 |
| 3,021,584 | 2/1962 | Polanski | 24/270 |
| 3,183,569 | 5/1965 | Webb et al. | 24/270 |
| 3,201,156 | 8/1965 | Coats | 24/273 |
| 3,982,446 | 9/1976 | Van Dyken | 74/488 |
| 4,060,008 | 11/1977 | Wilkinson | 74/488 |
| 4,137,793 | 2/1979 | Sowell | 74/488 |

Primary Examiner—John J. Love
Assistant Examiner—Donn McGiehan
Attorney, Agent, or Firm—Fulwider, Patton, Rieber, Lee & Utecht

[57] ABSTRACT

A cruise control mounted on an accelerator control sleeve rotatably supported on a handle bar, and stabilized by a connection to the throttle cable. The cruise control has a body in the form of a split ring, with an over-center clamping actuator on one side to bring the body into frictional engagement with the sleeve, and a pivotal link on the opposite side permitting opening of the body for installation. A stabilizing tab is formed on the link to engage the throttle cable or cables, and a second form, without this link, has the tab on the body.

6 Claims, 6 Drawing Figures

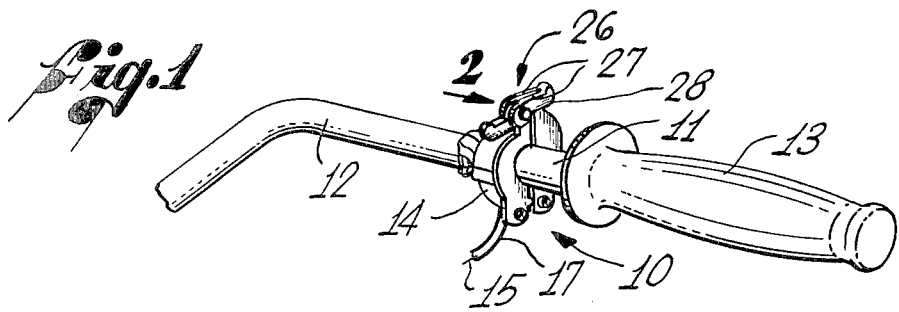
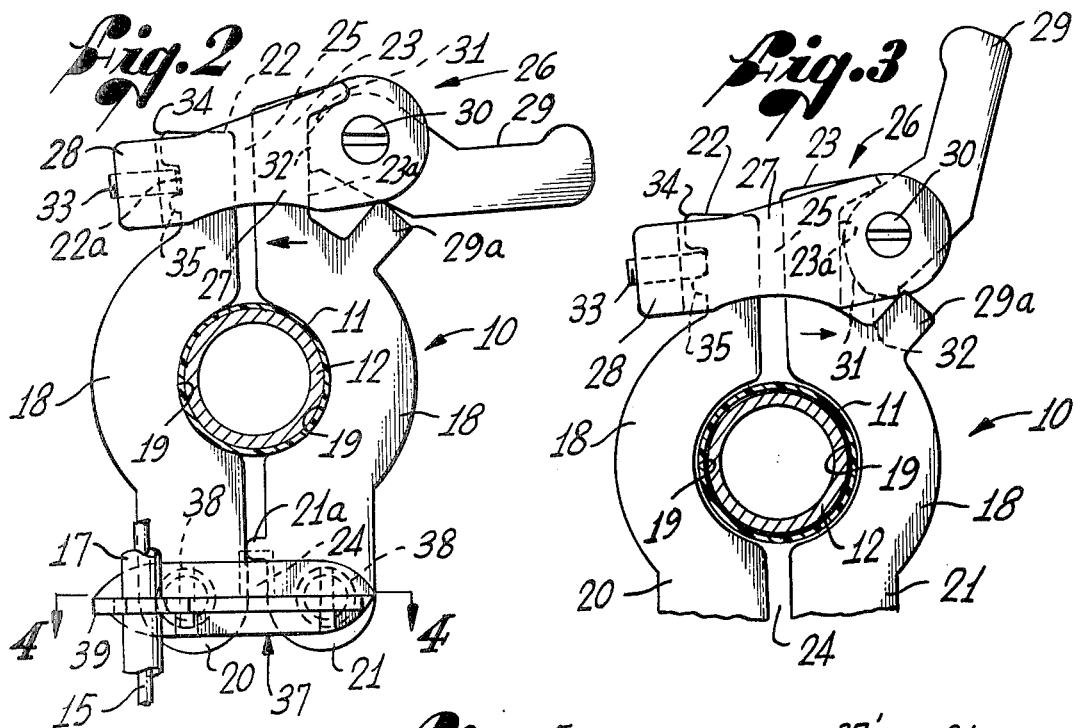
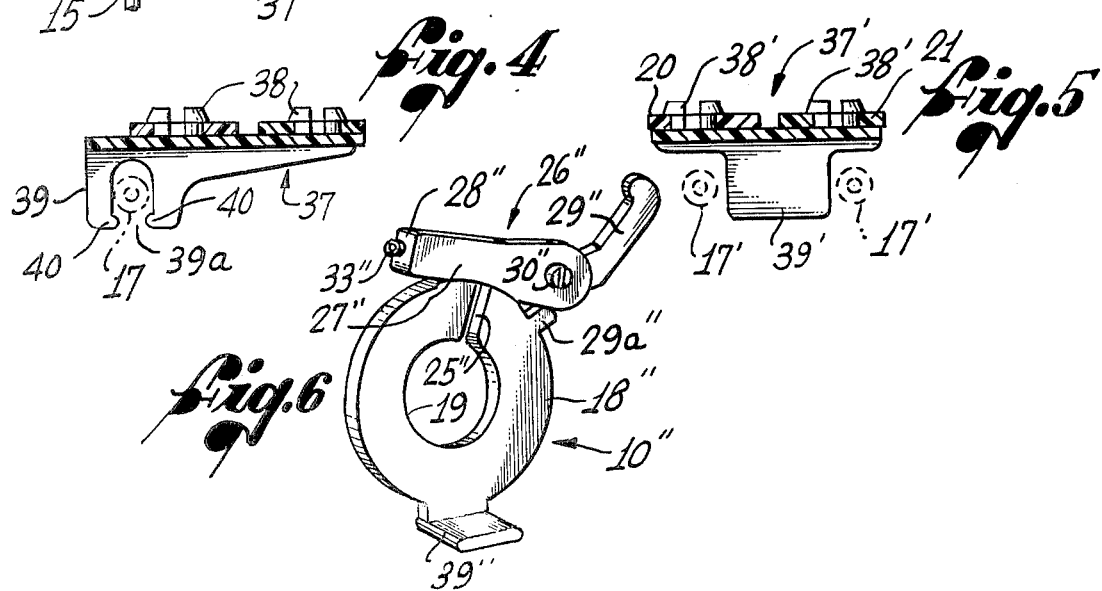

CRUISE CONTROL

BACKGROUND OF THE INVENTION

This invention relates to throttle controls for motorcycles and the like, and has particular reference to a cruise control assembly that is mountable on the handlebar of a motorcycle and operable to set and hold the throttle in a selected condition. The typical motorcycle throttle mechanism is operated by rotation of a handle grip on one end of the handlebar, the handle grip being connected through an accelerator control sleeve, rotatably fitted on the handlebar, to a housing, where the rotary motion is converted to linear motion of a cable-enclosed throttle wire leading to the throttle linkage of the motorcycle's carburetor. Thus, the operator accelerates or decelerates simply by turning the handle grip back and forth, and holds a steady motor speed by maintaining the grip in one angular position.

Cruise controls have been known for various types of vehicles, including motorcycles and the like, but in the case of motorcycles, such controls have been relatively complicated and expensive, or unreliable, or unsightly, or in some cases unsafe because of an inability of the operator to easily disengage, or override, the cruise control in dangerous situations. A control typically is mounted on the handlebar, to engage and lock the throttle mechanism as desired by the operator.

The principal objective of this invention is to provide a very inexpensive and effective cruise control that is easy to install, simple to disengage, and capable of being overridden with ease by the operator in emergency situations.

SUMMARY OF THE INVENTION

The present invention resides in a cruise control of the foregoing character that has a split body with an opening for encircling the accelerator control sleeve, and a simple actuator for clamping the body around the sleeve, into frictional engagement with an adjustable tightness that can be manually overridden without disengagement of the actuator. The preferred embodiment also has a second split in the body and a pivotal connection permitting opening of the body for ease of installation.

More specifically, as illustrated by embodiments shown herein, the cruise control has a selectively engageable actuator for constricting the opening into clamping engagement, adjustment of the extent of clamping by a simple set screw, and releasable retention in engaged condition by an overcenter cam permitting rapid "flip off" disengagement. Even when the control is engaged, however, manual operation remains effective, so long as the proper adjustments in clamping have been made.

All of the parts are sturdy and capable of inexpensive mass-production, as by injection molding of a suitable relatively rigid, but somewhat flexible, resilient plastic material. Although installation is possible by slipping the device over the end of the handlebar and onto the control sleeve, the preferred form has a pivotal, link connection on the side of the body opposite the actuator permitting opening of the body after removal of the actuator, which is easily reassembled and adjusted when the body is in place on the sleeve.

To stabilize the cruise control, a tab is provided to interfit with the throttle cable means, a solid tab for interfitting between double-throttle cables, and a forked tab for interfitting around a single cable. This tab is on the body in one embodiment, and on the connecting link in the other.

Other aspects and advantages of the invention will become apparent from the following detailed description, taken in conjunction with the accompanying drawings.

BRIEF DESCRIPTION OF THE DRAWINGS

FIG. 1 is a fragmentary perspective view showing a cruise control in accordance with the present invention on the handlebar of a motorcycle or the like;

FIG. 2 is an enlarged cross-sectional view taken along line 2—2 of FIG. 1, with the cruise control engaged; 1.

FIG. 3 is a partial view similar to FIG. 2 with the cruise control disengaged;

FIG. 4 is a cross-sectional view taken along line 4—4 of FIG. 2;

FIG. 5 is a view similar to FIG. 4 showing an alternate form of a stabilizing tab; and FIG. 6 is a perspective view of a second form of the invention.

DETAILED DESCRIPTION

As shown in the drawings for purposes of illustration, the invention is embodied in a cruise control, indicated generally by the reference number 10, that is mounted on a rotary accelerator control sleeve 11 on a handlebar 12, having a rotary grip 13 on one end, connected to the sleeve 11 so that turning of the grip also turns the sleeve.

The sleeve 11 extends through the cruise control 10 to a housing 14 stationarily mounted on the handlebar 12, where the rotary motion of the sleeve is converted (in a conventional manner) into linear motion of a throttle wire 15 encased in a protective throttle cable 17. This throttle wire extends to the throttle linkage of the carburetor (not shown) of the motorcycle, thus controlling the operation of the motor.

As shown most clearly in FIGS. 2 and 3, the cruise control 10 has a body in the form of a split ring formed in two parts, each having a central portion 18 defining a generally semi-circular recess 19 which cooperates with the recess in the other part to define a semi-circular central opening, and also having two lugs projecting in opposite directions from the central portion 18. The lower lugs are indicated by the numbers 20 and 21, and the upper lugs by the numbers 22 and 23. The two pairs of lugs define two gaps 24 and 25 in the body, leading into the central opening. The handlebar 12 and sleeve 11 extend through this opening when the cruise control is installed.

To clamp the body against, and thus restrain, the sleeve 11, an actuator 26 is mounted on the cruise control, on the upper side as shown herein, to draw the two lugs 22 and 23 toward each other, thus narrowing the gap 25 and constricting the central opening, bringing the recess surfaces 19 into frictional clamping engagement with the sleeve 11. For this purpose, the actuator comprises a generally u-shaped head link having two parallel arms 27, connected on one side by a cross-piece 28 which lies along the outer side of the lug 22, and an actuating lever 29 having one end portion deposed between the free ends of the arms 27 and pivoted thereon by a pin 30, to rock about an axis defined by the pin.

Formed on the pivoted end portion of the lever 29 is a cam surface 31 which faces the outer side surface 23a of the lug 23, and engages this surface as the lever is swung clockwise about the pin 30, from the disengaged position in FIG. 3 to the engaged position in FIG. 2. Thus, the side surface 23a acts as a cam follower for the cam surface 31, and is forced to the left during engagement, as the lug 22 is pulled to the right.

At the end of the cam surface 31 is a flat 32 which is an over-center, releasable latching means for the actuator. A stop 29a determines the engaged position of the lever. When the flat 32 is in engagement with the surface 23a, a positive disengaging force is required to throw or flip the lever back to the position in FIG. 3. The body preferably is made resilient to assist in full disengagement.

Adjustment of the extent of constriction, and the resulting clamping, in the engaged position of the actuator 26 is accomplished simply and effectively by means of an adjusting set screw 33 that is threaded through the cross-piece 28 toward the outer surface 22a of the lug 22, engaging this surface in a seat formed between an overhanging detent 34 and an underlying bump 35. By turning this screw, the effective length of the head link can be varied or, stated another way, the width of the gap 25 in the disengaged condition (FIG. 3) can be varied, for tighter or looser clamping of the sleeve 11 in the engaged condition (FIG. 2).

In the preferred embodiment, the lower lugs 20 and 21 are connected by a link 37 and form a hinge permitting opening of the cruise control for installation when the actuator 26 is removed. A nib 21a on the inner side surface of the lug 21 maintains the spacing of the lugs adjacent the link 37, which preferably is fastened to the two lugs by two split, headed studs 38. These studs are resiliently flexible, and are snap-fitted through two holes in the lugs, the beveled-heads of the studs yielding to pass through the holes and then expanding into locking positions. These studs preferably form pivots with at least one, and herein both, of the lugs 20 and 21.

To stabilize the cruise control on the motorcycle, a tab 39 is provided to interfit with a convenient part, herein the throttle cable 17, and restrain the cruise control against rotation with the sleeve 11. In FIG. 4 is shown a forked tab 39, integral with the connecting link and projecting to one side thereof. The recess 39a defined by the fork receives the cable, which is held in place by detents 40 at the entry into the recess, more closely spaced than the diameter of the cable.

Shown in FIG. 5 is a modified form of the connecting link, numbered 37' and having a solid stabilizing tab 39' designed to fit between the two cables 17' of a double-throttle control. In all other relevant respects, this link is the same as the line 37 in FIGS. 1 through 4, and corresponding parts are simply shown by corresponding, primed reference numbers.

With a cruise control 10 of the foregoing type, installation may be accomplished by slipping the body over the end of the control sleeve 11, after the handle grip 13 has been removed, but the easier and preferred approach is simply to remove the actuator 26 and open up the body, as permitted by the hinge formed by the link 37 and the studs 38. Removal of the actuator is accomplished by loosening the set screw 33 until the head link and its connected parts will slip off the upper lugs 22 and 23.

Then, when the body has been fitted around the sleeve 11, beside the housing 14, with the tab 39 (or 39') facing toward the cable 17 (or the cables 17'), the tab is interfitted with the cable or cables, and the head link is slipped back over the upper lugs. The set screw 33 is adjusted just tightly enough so that the sleeve 11 will not slip when the actuator is engaged, but preferably not so tight as to prevent manual turning of the sleeve as an override. The cruise control then is ready for operation.

While a variety of materials may be used, the material should be relatively hard and rigid, durable and resistant to wear and weather, and slightly flexible to permit the clamping movement, and resilient to open up when the actuator is disengaged. A preferred material is the nylon sold under the trademark "ZYTEL ST", from which the body pieces may be made as flat plates, and all of the parts of the cruise control also may be made and mass-produced by injection molding, preferably in black color to blend with the other parts and minimize the appearance of an "add-on" device.

Shown in FIG. 6 is a second embodiment of the invention, without the opening-hinge feature provided by the link 37 and the studs 38 of the preferred embodiment. In this case, in which corresponding parts are indicated by corresponding double-primed reference numbers, the body is formed by a ring 18" having only one gap 25", defined between spaced apart end surfaces of the split ring, as before.

This cruise control 10" may be installed over the sleeve 11 after removal of the handle grip 13, but in all other relevant respects, is the same as the cruise control 10.

From the foregoing, it should be evident that the present invention provides a simple and effective cruise control for the intended area of use, and is easily installed and adjusted, easily disengaged, and capable of manual override in emergency situations. It also will be evident that, while two specific embodiments have been illustrated and described, various modifications and changes may be made without departing from the spirit and scope of the invention.

I claim as my invention:

1. A cruise control for a motorcycle or the like having an accelerator control sleeve rotatably mounted on a handle bar and connected by cable means to a throttle, having:

a split body composed of relatively rigid but somewhat flexible plastic material, in the form of two shaped, flat plates in edge-to-edge relation and each defining a generally semi-circular recess in its inner edge portion cooperating with the recess in the other plate to define a central generally circular opening, and first and second end lugs projecting in different directions from the body, and cooperating with the lugs of the other plate to define two gaps extending in different directions from said circular opening;

a connecting link comprised of said plastic spanning the two lugs defining one gap, means fastening said connecting link to said lugs and forming a pivotal connection between the link and at least one lug;

and a selectively operable actuator connected to the two lugs defining the other gap, and including a generally U-shaped head link having two arms straddling the two lugs and a cross-piece across the outer surface of one of the lugs, an adjusting screw threadedly carried by said head link and bearing against said outer surface, means preventing sliding of said screw along said surface, a control lever having one end pivotally mounted between said arms on the outer side of the other of the two lugs, a cam mounted on said lever between said arms, a follower surface on the outer side of said other of the two lugs engageable by said cam to force said two lugs together and constrict said opening to frictionally grip the accelerator control sleeve, and an over-center flat on said cam engageable with said follower to hold the actuator releaseably in a clamping condition, thereby to restrain movement of the sleeve.

2. A cruise control as defined in claim 1 in which said means fastening said connecting link to said lugs comprise two split, headed studs integral with said connecting link and snap-fitted in holes in said link.

3. A cruise control as defined in claim 1 further including means on said connecting link for interfitting with the throttle means, thereby to stabilize said body.

4. A cruise control for a motorcycle or the like having an accelerator control sleeve rotatably mounted on a handle bar and connected by cable means to a throttle, having:

a split body composed of relatively rigid but somewhat flexible plastic material, in the form of two shaped, flat plate portions in edge-to-edge relation and each defining a generally semi-circular recess in its inner edge portion cooperating with the recess in the other plate portion to define a central generally circular opening, and at least one end lug projecting from the body, and cooperating with the corresponding lug of the other plate portion to define a gap extending from said circular opening;

and a selectively operable actuator connected to the two lugs defining the gap, and including a generally U-shaped head link having two arms straddling the two lugs and a cross-piece across the outer surface of one of the lugs, an adjusting screw threadedly carried by said head link and bearing against said outer surface, means preventing sliding of said screw along said surface, a control lever having one end pivotally mounted between said arms on the outer side of the other of the two lugs, a cam mounted on said lever between said arms, a follower surface on the outer side of said other of the two lugs engageable by said cam to force said two lugs together and constrict said opening to frictionally grip the accelerator control sleeve, and an over-center flat on said cam engageable with said follower to hold the actuator releaseably in a clamping condition, thereby to restrain movement of the sleeve.

5. A cruise control as defined in claim 4 further including means for interfitting with the throttle means, thereby to stabilize said body.

6. A cruise control for a motorcycle or the like having a rotary accelerator control of circular crosssection for actuating a throttle, and having:

a body in the form of a split ring composed of relatively rigid but slightly flexible resilient material, having an opening for loosely encircling the accelerator control, two sets of spaced apart end surfaces defining one and another gaps on generally opposite sides of the ring, and two outwardly projecting lugs on opposite sides of said one gap;

a selectively operable actuator connected to said ring across said other gap, and including a clamp mechanism for drawing said ends defining said other gap toward each other and thereby narrowing said other gap and radially constricting said opening into frictional clamping engagement with the accelerator control;

means for releasably holding said actuator in a ring-constricting condition thereby to restrain the accelerator control against turning from a given position; and a link hingedly fastened to the ring across said one gap, to permit opening of the ring for installation on the accelerator control, said link being releasably fastened to said lugs by fasteners forming hinge joints between the lugs and the link, permitting rotation of the link relative to the parts of the ring, said fasteners being split headed studs integral with the link and snap fitted in holes in the link.

* * * * *